July 22, 1947.  C. C. HONEYWELL  2,424,464
ELECTRICAL REGULATOR
Filed April 26, 1945
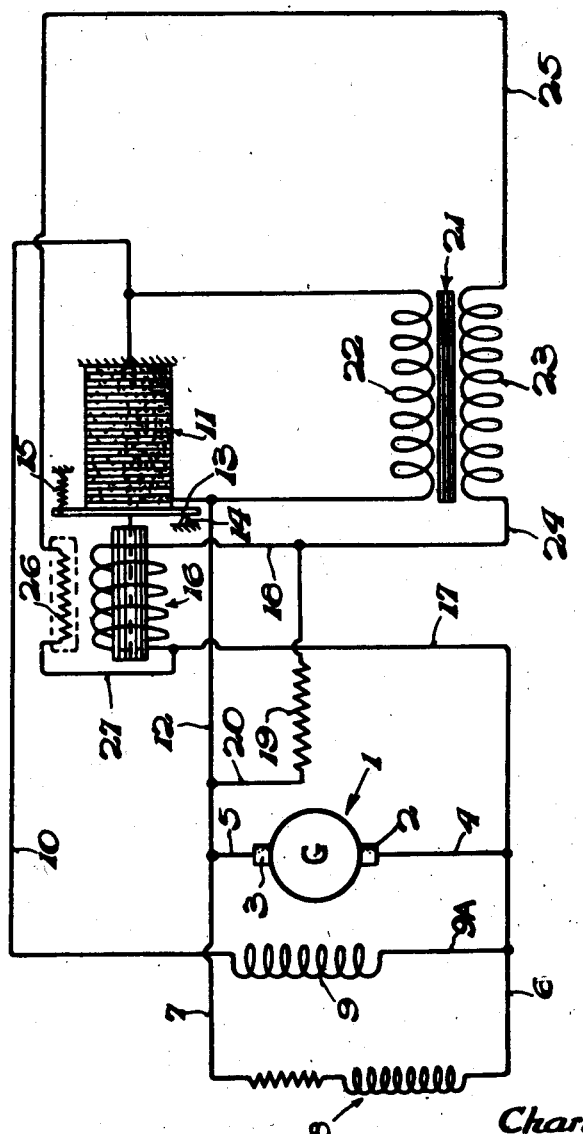
INVENTOR.
Charles C. Honeywell
BY
Herbert L. Davis, Jr.
ATTORNEY Patented July 22, 1947

2,424,464

UNITED STATES PATENT OFFICE 2,424,464

ELECTRICAL REGULATOR

Charles Clinton Honeywell, New Milford, N. J., assignor to Bendix Aviation Corporation, Teterboro, N. J., a corporation of Delaware Application April 26, 1945, Serial No. 590,374

4 Claims. (Cl. 171—229)

1

The present invention relates to electrical regulators and more particularly to a novel electrical system whereby hunting of the regulator may be reduced and a controlled voltage maintained at a desired value.

An object of the invention is to provide in a voltage regulating system, novel electrical means for effecting stability of control.

Another object of the invention is to provide novel means for effecting anti-hunt characteristics in a voltage regulator.

Another object of the invention is to provide in an electromagnetically operated variable resistance device for regulating the output of a generator, novel means connected across the resistance device for utilizing changes in the resistance thereof for providing a follow-up action retarding further change.

Another object of the invention is to arrange in a regulator of the carbon pile type, a transformer having its primary winding connected across the carbon pile and its secondary winding in circuit with an electromagnetic winding for controlling the carbon pile so as to provide, upon change in the resistance of the carbon pile, a follow-up action tending to retard adjustment of said carbon so as to prevent over adjustment of the carbon pile and hunting of the regulator.

Another object of the invention is to provide a novel temperature responsive element for governing the follow-up action.

Another object of the invention is to provide a novel resistance element for compensating the regulator for changes in temperature.

Another object of the invention is to provide the latter temperature compensating resistance element in circuit with the secondary winding of the aforementioned transformer so as to provide a circuit in parallel with the control winding which compensates for changes in the resistance of the control winding due to changes in temperature and also effects a follow-up action for maintaining stability in the regulator.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claims for this purpose.

The drawing is a diagrammatic view illustrating an electrical system embodying one form of my invention.

In the form of the invention shown in the drawing there is provided a direct current generator of conventional type and indicated generally by the numeral 1.

The generator 1 has an armature winding, not shown, but which may be of conventional type. Connections from the armature winding lead to a suitable commutator having brushes 2 and 3 and output lines 4 and 5 leading from the brushes to lines 6 and 7 which lead to a variable load indicated generally by the numeral 8. The armature is driven by a suitable power source, not shown.

The generator 1 has a suitable field winding 9 having one end thereof connected by a conductor 9A to the line 6.

The opposite end of the field winding 9 is connected by a conductor 10 to one end of a variable resistance carbon pile element 11. The opposite end of the carbon pile 11 is connected through conductor 12 to the output line 5. Thus the carbon pile 11 controls the energization of the field winding 9 which in turn controls the output of the generator 1 in a manner well known in the art.

The carbon pile 11 forms one element of a carbon pile regulator shown diagrammatically in the drawing as including an armature 13 pivoted at 14 and exerting a compressive force upon the carbon pile 11 under tension of a spring 15. The position of the armature 13 is controlled by an electromagnet 16 having a core and exerting an electromagnetic force acting in opposition to the spring 15. The spring 15 is so arranged as to balance the pull on the armature 13 by the electromagnet 16 when the electromagnet 16 is energized by a voltage having a predetermined value. The regulator is preferably of a type such as shown in the copending patent application Serial Number 570,002 of William G. Neild, filed December 27, 1944.

One end of the electromagnetic winding 16 is connected through a conductor 17 to the output line 4. The opposite end of the electromagnetic winding 16 is connected through a conductor 18 to one end of a ballast resistor 19.

The resistor 19 is connected through an electrical conductor 20 to the conductor 12 and thereby to the output line 5.

Thus it will be seen, that the electromagnet 16 will be energized in response to the output voltage across the lines 4 and 5. Moreover, a change in such voltage will cause an adjustment of the armature 13 so as to cause a corresponding adjustment of the carbon pile 11 to maintain a substantially constant output voltage in the lines 4 and 5.

In such a system due to changes in load or driven speed of the generator the regulator in attempting to follow such changes will tend to approach instability due to hunting of the regulator.

An object of my invention therefore is to provide an anti-hunt circuit whereby an electrical follow-up action is introduced into the regulator system. This is accomplished by providing a transformer 21 including a high tension primary winding 22 and a low tension secondary winding 23. The primary winding 22 is connected at opposite ends to the lines 10 and 12 and thus across the carbon pile 11.

The secondary winding 23 is connected at one end by a conductor 24 to the line 18, and at the opposite end by a conductor 25 to a resistor element 26 for a purpose which will be described hereinafter. The resistor element 26 is connected at the opposite end by a conductor 27 to the conductor 17.

From the foregoing it will be seen, that the voltage applied across the primary winding 22 will be the same as that across the carbon pile 11. Moreover, as the resistance of the carbon pile 11 is varied in response to change in the voltage across the lines 4 and 5, a corresponding change in the voltage drop or fall of potential across the carbon pile 11 is effected. This in turn causes the voltage applied across the primary winding 22 of the transformer 21 to change effecting an induced voltage in the secondary winding 23. The secondary winding 23 is connected in circuit with the control winding 16 through electrical conductors 24, 25, resistor 26 and conductor 27 so as to form a closed circuit and is so arranged that the momentary voltage induced in the winding 23 by change in the voltage drop across the carbon pile 11 tends to act upon the eletromagnetic winding 16 so as to retard or limit further change in a like direction. Thus the voltage induced in the winding 23 upon an increase in the voltage across the resistance 11, as upon an increase in the resistance of the carbon pile 11, acts in opposition to the flow of current through winding 16 from the output lines 4 and 5 of the generator 1. The thus induced voltage in acting through the winding 16 tends to oppose an increase in the magnetic field created by the current under the voltage across the output lines 4 and 5. The induced voltage in winding 23 thus momentarily tends to oppose further change in the position of the armature 13 in a resistance increasing direction.

Likewise upon a decrease in the resistance of the carbon pile 11 causing a decrease in the voltage applied across the primary winding 22, there is induced in the secondary winding 23 a voltage and a resulting current which flows in a direction through the winding 16 tending to momentarily augment the energizing current in the winding 16 from the output lines 4 and 5. The induced current in winding 23 thus momentarily tends to oppose further change in the position of the armature 13 in a resistance decreasing direction.

In the operation of the latter arrangement, it will be seen that the transformer 21 connected across the carbon pile 11 will respond to change in the resistance of the carbon pile 11 so as to effect a follow-up action tending to prevent the carbon pile 11 from over adjustment.

Thus upon an increase in voltage across the output lines 4 and 5, the energization of the electromagnetic winding 16 will be increased adjusting the armature 13 against the tension of the spring 15 in a resistance increasing direction. Moreover, upon such increase in the resistance of the carbon pile 11, the voltage applied through the transformer 21 on the electromagnetic winding 16 during such change will tend to decrease the magnetic field of the winding 16 and thereby effect a follow-up action tending to prevent over adjustment of the carbon pile in a resistance increasing direction.

Of course, upon a decrease in the voltage across the output lines 4 and 5, an opposite effect will result so that energization of the electromagnetic winding 16 will be decreased, causing the spring 15 to bias the armature 13 in a resistance decreasing direction. The latter action will cause the voltage applied through the transformer 21 to tend to increase the magnetic field of the electromagnetic winding 16 so as to thereby effect a follow-up action tending to prevent over adjustment of the carbon pile in a resistance decreasing direction.

Thus there will result an electrical follow-up action in response to change in the resistance of the carbon pile 11 for momentarily limiting, opposing and retarding adjustment of the carbon pile 11 in a resistance increasing or resistance decreasing direction. The latter arrangement will thereby prevent over adjustment of the carbon pile 11 and hunting of the regulator.

There is further provided in the latter follow-up circuit a resistor 26 which may be positioned adjacent or about the winding of the regulating coil 16 so as to be subject to substantially the same temperature effects as the regulating coil 16.

The resistor 26 is formed of a material having a greater temperature coefficient of resistance than the material of the regulating coil 16 and the resistor 26 is so arranged that the combined resistance of the secondary winding 23 and the resistor 26 vary at a greater rate than that of the coil 16 over the ordinary expected range of temperature changes so that upon an increase in the temperature at the coil 16 increasing the resistance thereof, the resistance of the resistor 26 adjacent thereto will also increase, but at a greater rate so as to decrease the shunting effect of the secondary winding 23 plus resistor 26 so as to compensate for changes in the resistance of the coil 16 due to such increase in temperature.

Likewise upon a decrease in temperature the resistance of the coil 16 will decrease, together with the resistance of resistor 26. The resistance of the resistor 26 will decrease at a greater rate so that the shunting effect of the secondary winding 22 plus resistor 26 will increase so as to compensate for the decrease in the resistance of the resistor 26 due to such decrease in temperature.

In further explanation of the operation of the latter temperature compensating means 26, the ballast resistance 19 is preferably formed of a material having a substantially zero temperature coefficient of resistance and leads from the generator output line 5 through coil winding 16 to the output line 4. Extending in parallel to the winding 16 is the winding 23 and resistor 26. The winding 23 is arranged so that the resistance thereof is substantially uneffected by such temperature change. However, since the resistance of the resistor 26 increases with the rise in temperature more rapidly than the resistance of coil 16, it will be seen that upon such a resulting increase in the voltage drop across the resistor 26 plus winding 23 there will be effected an increase in the voltage applied across coil 16. The resistor 26 is so arranged that the corresponding increase in the voltage across the coil 16 will in effect compensate for the increase in the resistance of the coil 16 due to rise in temperature. A corresponding compensating action will be effected upon a decrease in temperature.

Moreover, while the resistor 26 is shown as connected in series with the secondary winding 23 it will be readily apparent that if desired the transformer 21 may be omitted in which case the resistor 26 may be connected solely in parallel to the coil 16 so as to accomplish the desired temperature compensation.

Likewise, if desired, the temperature compensating means 26 may be omitted so as to provide follow-up action solely. In the arrangement shown in the present invention, however, in which the variable resistance means 26 is provided in series with the secondary winding 23 of the follow-up transformer 21, not only is the coil 16 compensated for temperature changes, but the follow-up action of the secondary winding 23 is likewise temperature compensated.

Thus as the resistance of the coil 16 increases upon a rise in temperature causing a corresponding decrease in the sensitivity of the coil 16, the resistance of the temperature responsive element 26 likewise increases so as to decrease the intensity of the follow-up action on the coil 16, while increasing the duration thereof so as to provide a follow-up action more in accordance with the condition of the regulator coil 16.

Similarly at lower temperatures at which the resistance of the coil 16 is less and the sensitivity of the coil 16 greater, the intensity of the electrical follow-up impulse is greater so as to provide a sharper follow-up action under greater sensitivity conditions of the coil 16.

Thus it will be seen that there is provided herein a novel follow-up means which is temperature compensated so as to provide an electrical follow-up impulse of greater intensity under temperature conditions at which the regulator coil 16 has greater sensitivity and a follow-up electrical impulse of less intensity under temperature conditions at which the regulator coil 16 has less sensitivity.

Although only one embodiment of the invention has been illustrated and described, various changes in the form and relative arrangements of the parts, which will now appear to those skilled in the art, may be made without departing from the scope of the invention. Reference is therefore to be had to the appended claims for a definition of the limits of the invention.

What is claimed is:

1. In a regulating system for a generator of the type including a field winding for controlling a condition of the output of said generator, first means electrically connecting said field winding in series with a first variable resistance element, said first resistance element and field winding connected across the output of said generator, an electromagnetic winding, regulating means for said variable resistance element, said regulating means operatively controlled by said electromagnetic winding, a second resistance element, second means electrically connecting said electromagnetic winding and the second resistance element in series, said electromagnetic winding and second resistance element connected across the output of the generator; the combination comprising a transformer including a primary winding and a secondary winding, the primary winding connected across the variable resistance element, a resistor positioned adjacent said electromagnetic winding, said resistor having a greater temperature coefficient of resistance than said electromagnetic winding, said resistor connected in series with said secondary winding across the electromagnetic winding so as to compensate for changes in the resistance of said electromagnetic winding due to temperature and so arranged as to cause upon change in the resistance of said variable resistance element an electrical impulse to effect said electromagnetic winding so as to prevent hunting of the regulating means.

2. In a regulator of the type including a variable resistance element, and an electromagnetic winding for controlling said variable resistance element; the combination comprising an inductive coupling means including a first winding connected across said variable resistance element and a second winding connected across said electromagnetic winding so that changes in the resistance of said element will cause a change in the current flow in said first winding so as to induce a follow-up voltage in said second winding, said second winding including a circuit so arranged that said follow-up voltage acts in such a manner as to effect said electromagnetic winding so as to prevent hunting of the regulator, and an electrical resistor means in which the electrical resistance is variable in response to changes in temperature, said resistor means connected in said second winding circuit so as to adjust the voltage drop across said electromagnetic winding so as to compensate for changes in the resistance of said electromagnetic winding due to such changes in temperature and said resistor means also so arranged as to vary the intensity of said follow-up voltage so as to provide a follow-up action of greater intensity under greater sensitivity conditions of the electromagnetic winding.

3. In a regulating system for a generator of the type including a variable resistance element for regulating a condition of the output of said generator, and electromagnetic means for controlling said variable resistance element and responsive to an electrical condition of the output of said generator; the combination comprising electrical follow-up means arranged in such a manner that upon a change in the resistance of said element in one sense there will be applied a voltage to said electromagnetic means for retarding the adjustment of said resistance element by said electromagnetic means in said one sense, and temperature responsive means connected in circuit with said electrical follow-up means and in series relation with said electromagnetic means for varying the intensity of said follow-up voltage in accordance with temperature conditions effecting the sensitivity of said electromagnetic means.

4. In a regulator, the combination of means for controlling a variable condition, means for operating said controlling means in response to changes in said variable condition, the sensitivity of said operating means being variable with temperature, means for effecting a follow-up action upon a change of said controlling means, said follow-up means being arranged to partially oppose the stated change of said controlling means by said operating means, and temperature responsive means governing said follow-up action in accordance with temperature conditions to provide an increased follow-up action under greater sensitivity conditions of the operating means.

CHARLES CLINTON HONEYWELL.

REFERENCES CITED

The following references are of record in the file of this patent:

UNITED STATES PATENTS

| Number | Name | Date |
|---|---|---|
| 1,717,293 | Winter | June 11, 1929 |
| 2,386,031 | Bodine | Oct. 2, 1945 |
| 2,170,193 | Godsey | Aug. 22, 1939 |